United States Patent
Hirata (10) Patent No.: US 9,480,075 B2
(45) Date of Patent: Oct. 25, 2016

(54) COMMUNICATION SYSTEM, COMMUNICATION APPARATUS AND COMMUNICATION CONTROL METHOD

(71) Applicant: KYOCERA CORPORATION, Kyoto (JP)

(72) Inventor: Yoshitsugu Hirata, Osaka (JP)

(73) Assignee: KYOCERA Corporation, Kyoto (JP)

(*) Notice: Subject to any disclaimer, the term of this patent is extended or adjusted under 35 U.S.C. 154(b) by 82 days.

(21) Appl. No.: 14/385,508

(22) PCT Filed: Mar. 22, 2013

(86) PCT No.: PCT/JP2013/001959
§ 371 (c)(1),
(2) Date: Sep. 16, 2014

(87) PCT Pub. No.: WO2013/140817
PCT Pub. Date: Sep. 26, 2013

(65) Prior Publication Data
US 2015/0063242 A1 Mar. 5, 2015

(30) Foreign Application Priority Data
Mar. 22, 2012 (JP) .................................. 2012-066101

(51) Int. Cl.
*H04W 72/08* (2009.01)
*H04L 1/00* (2006.01)
(Continued)

(52) U.S. Cl.
CPC ......... *H04W 72/087* (2013.01); *H04B 7/0413* (2013.01); *H04L 1/00* (2013.01); *H04L 27/00* (2013.01); *H04L 27/0008* (2013.01); *H04W 72/042* (2013.01)

(58) Field of Classification Search
CPC ...... H04W 72/087; H04L 1/00; H04L 27/00; H04L 27/0008
See application file for complete search history.

(56) References Cited

U.S. PATENT DOCUMENTS 6,539,031 B1* 3/2003 Ngoc .................... H04L 1/0003
370/465
7,388,919 B2* 6/2008 Varma .................. H04L 1/0002
375/227
(Continued)

FOREIGN PATENT DOCUMENTS

JP 2005-136458 A 5/2005
JP 2006-211017 A 8/2006
(Continued)

OTHER PUBLICATIONS

An Office Action; "Notice of Reasons for Rejection," issued by the Japanese Patent Office on Jun. 2, 2015, which corresponds to Japanese Patent Application No. 2014-506050 and is related to U.S. Appl. No. 14/385,508; with English language concise explanation.

(Continued)

*Primary Examiner* — Albert T Chou
(74) *Attorney, Agent, or Firm* — Studebaker & Brackett PC (57) ABSTRACT

There are provided a communication system, a communication apparatus and a communication control method capable of minimizing the decline in throughput efficiently. The communication system according to the present invention includes a communication apparatus configured to employ an adaptive modulation system and a corresponding communication apparatus configured to communicate wirelessly with the communication apparatus, in which the corresponding communication apparatus receives a wireless signal from the communication apparatus, calculates the reception quality value and the bit error rate of the wireless signal, and transmits the reception quality value and the bit error rate to the communication apparatus; and the communication apparatus has a table indicating a modulation class to be chosen corresponding to the reception quality value and changes a modulation class indicated by the table based on the bit error rate.

20 Claims, 3 Drawing Sheets

(51) Int. Cl.
*H04L 27/00* (2006.01)
*H04B 7/04* (2006.01)
*H04W 72/04* (2009.01)

(56) References Cited

U.S. PATENT DOCUMENTS

| | | | | |
|---|---|---|---|---|
| 8,300,716 | B1* | 10/2012 | Lee | H04L 1/0003 370/241 |
| 2004/0156446 | A1* | 8/2004 | Santhoff | H04B 1/71632 375/295 |
| 2006/0133402 | A1* | 6/2006 | Dottling | H04L 1/0001 370/431 |
| 2008/0075551 | A1 | 3/2008 | Nakazima | |
| 2008/0090575 | A1* | 4/2008 | Barak | H04B 7/0417 455/444 |
| 2009/0238094 | A1* | 9/2009 | Miyoshi | H04B 7/2659 370/253 |
| 2009/0274199 | A1 | 11/2009 | Onodera et al. | |
| 2009/0292967 | A1 | 11/2009 | Sasaki | |
| 2010/0188984 | A1 | 7/2010 | Futagi et al. | |
| 2010/0306615 | A1 | 12/2010 | Kishimoto et al. | |
| 2010/0330923 | A1 | 12/2010 | Okino | |
| 2014/0044080 | A1 | 2/2014 | Futagi et al. | |

FOREIGN PATENT DOCUMENTS

| | | |
|---|---|---|
| JP | 2009-182636 A | 8/2009 |
| JP | 2010-278910 A | 12/2010 |
| JP | 2011-244509 A | 12/2011 |
| WO | 2006/075547 A1 | 7/2006 |
| WO | 2007/037412 A1 | 4/2007 |
| WO | 2008/035763 A1 | 3/2008 |

OTHER PUBLICATIONS

International Search Report; PCT/JP2013/001959; May 21, 2013.
Written Opinion of the International Searching Authority; PCT/JP2013/001959; May 21, 2013; with concise explanation.

* cited by examiner

FIG. 1

COMMUNICATION SYSTEM, COMMUNICATION APPARATUS AND COMMUNICATION CONTROL METHOD

CROSS REFERENCE TO RELATED APPLICATION

This application claims priority to and the benefit of Japanese Patent Application No. 2012-066101 filed on Mar. 22, 2012, the entire contents of which are incorporated herein by reference.

TECHNICAL FIELD

The present invention relates to a communication system, a communication apparatus and a communication control method.

BACKGROUND ART

As a communication system by which a high-speed communication between a communication terminal and a base station is realized, LTE (Long Term Evolution), MC-CDMA (Multi Carrie Code Division Multiple Access), Wimax (Worldwide Interoperability for Microwave Access) (registered trademark) and the like are known.

In the past, in order to improve communication service in such communication systems, technologies such as MIMO (Multiple Input Multiple Output) system and adaptive modulation (link adaptation) system have been suggested.

MIMO system is a technology in which multiple transmitting antennas and receiving antennas are respectively combined to realize a pseudo broadband in data reception and transmission. The communication apparatus on the transmission side uses the same channel and transmits multiple signals from the multiple transmitting antennas, each signal having data different from each other. Then, the communication apparatus on the reception side receives multiple signals by the multiple receiving antennas and separates these spatially multiplexed signals to extract data. Since different data can be transmitted from the same channel, a faster communication is realized.

The adaptive modulation system is a technology in which a modulation class used for communication is changed depending on the situation of the communication between the communication terminal (mobile station), which is a communication apparatus, and a bases station (see, for example, Patent Document 1). The communication terminal calculates the reception quality information such as CINR (Carrier to Interference and Noise Ratio) based on the signal received from the base station, and sends the information to the base station. The base station specifies the modulation class corresponding to the reception quality information from the predefined MCS (Modulation and Coding System) table. In the MCS table, the higher the reception quality, the higher the speed of data transmission of the modulation class associated to the reception quality. Thus, if the reception quality is good, a higher modulation class by which data is communicated at a high speed is chosen, and if the reception quality is not good, a lower modulation class by which data is communicated at a low speed but data corruption is unlikely to occur is chosen.

CITATION LIST

Patent Literature

PTL 1: JP2011244509 (A)

SUMMARY OF INVENTION

However, in the past, the MCS table has been made based on the assumption of a specific communication environment. Then once it is made, it cannot be changed. The indoor communication environment may vary according to, for example, the room size, the position of furniture in a room, the position of pillars and the like, and may temporally vary according to the movement of persons indoors. In addition, the outdoor communication environment may vary according to, for example, the number of buildings and the size and the height of each of the buildings located between the communication terminal and the base station, and may temporally change according to automotive traffic and the like.

Therefore, it is highly likely that the communication environment contemplated when the MCS table is made is different from the actual communication environment, and thus the MCS table may not be suitable for the actual communication environment. Thus, in the actual communication environment, regardless of the fact that a certain modulation class can be used, a lower modulation class may be chosen based on the MCS table. In this case, the throughput cannot be increased to the level achievable by the actual communication environment. In addition, a modulation class higher than the modulation class that can be used by the actual communication environment may be chosen based on the MCS table. In this case, it is more likely that the communication terminal may not demodulate the received signal appropriately, causing decrease in the throughput.

Such a situation is particularly remarkable when MIMO system is used for the communication between the communication terminal and the base station. In MIMO system, even if the reception quality is high, if the spatial correlation, which is a fading between spatially separated two points, is high, signal separation will be difficult. Thus, even if the modulation class is chosen based on the reception quality information, the communication terminal cannot demodulate the received signal correctly, causing decrease in the throughput. In addition, in MIMO system, multiple desired signals of the same channel exist between the communication terminal and the base station, thus, compared with the communication between each antenna, decrease in CINR may occur, which may make it difficult for a higher modulation class to be chosen, and may interfere with an increase in throughput.

Therefore, the present invention has been conceived in light of the above mentioned problems, and provides a communication system, a communication apparatus and a communication control method that can efficiently reduce the decrease in throughput.

To solve the above mentioned problems, a communication system according to a first aspect of the present invention includes a communication apparatus configured to employ an adaptive modulation system and a corresponding communication apparatus configured to communicate wirelessly with the communication apparatus, in which the corresponding communication apparatus receives a wireless signal from the communication apparatus, calculates a reception quality value and a bit error rate of the wireless signal, and transmits the reception quality value and the bit error rate to the communication apparatus; and the communication apparatus has a table indicating a modulation class to be chosen corresponding to the reception quality value, and changes the modulation class based on the bit error rate.

Furthermore, according to a second aspect of the invention, in the communication system according to the first aspect, the modulation class is determined from a combination of a modulation system and a coding rate; and the communication apparatus performs, if the bit error rate is equal to or greater than a first threshold, at least either a decrease in the modulation system of the modulation class to be chosen to a lower modulation system or a decrease in the coding rate of the modulation class to be chosen.

Moreover, according to a third aspect of the invention, in the communication system according to the second aspect, the communication apparatus performs, if the bit error rate is less than a second threshold which is smaller than the first threshold, at least either an increase in the modulation system of the modulation class to be chosen to a higher modulation system or an increase in the coding rate of the modulation class to be chosen.

In addition, according to a fourth aspect of the invention, in the communication system according to the first aspect, the communication apparatus receives a bit error rate from the corresponding communication apparatus more than once; and changes the modulation class based on a plurality of bit error rates.

Furthermore, according to a fifth aspect of the invention, in the communication system according to the first aspect, the table varies according to time.

Moreover, according to a sixth aspect of the invention, in the communication system according to the first aspect, if a plurality of corresponding communication apparatuses exist, the table varies according to the plurality of corresponding communication apparatuses.

In addition, according to a seventh aspect of the invention, in the communication system according to the first aspect, the communication apparatus communicates with the corresponding communication apparatus via MIMO (Multiple Input Multiple Output) system.

Furthermore, according to a communication apparatus of an eighth aspect in which the present invention is realized as an apparatus, the communication apparatus:

employs an adaptive modulation system;

communicates wirelessly with a corresponding communication apparatus configured to calculate a reception quality value and a bit error rate of a wireless signal from the communication apparatus; and includes:

a communication unit configured to receive the reception quality value and the bit error rate from the corresponding communication apparatus;

a memory unit configured to store a table indicating a modulation class to be chosen corresponding to the reception quality value; and a control unit configured to change the modulation class based on the bit error rate.

Moreover, according to a ninth aspect of the invention, in the communication apparatus according to the eighth aspect, the modulation class is determined from a combination of a modulation system and a coding rate; and the control unit performs, if the bit error rate is equal to or greater than a first threshold, at least either a decrease in the modulation system of the modulation class to be chosen to a lower modulation system or a decrease in the coding rate of the modulation class to be chosen.

In addition, according to a tenth aspect of the invention, in the communication apparatus according to the ninth aspect, the control unit performs, if the bit error rate is less than a second threshold that is smaller than the first threshold, at least either an increase in the modulation system of the modulation class to be chosen to a higher modulation system or an increase in the coding rate of the modulation class to be chosen.

Furthermore, according to an eleventh aspect of the invention, in the communication apparatus according to the eighth aspect, the communication unit receives a bit error rate from the corresponding communication apparatus more than once, and the control unit changes the modulation class based on a plurality of bit error rates.

Moreover, according to a twelfth aspect of the invention, in the communication apparatus according to the eighth aspect, if a plurality of corresponding communication apparatuses exist, the table varies according to the plurality of corresponding communication apparatuses.

In addition, according to a thirteenth aspect of the invention, in the communication apparatus according to the eighth aspect, the communication apparatus communicates with the corresponding communication apparatus via MIMO system.

As mentioned above, although the means for solving the problems according to the present invention has been described as an apparatus, it is appreciated that the present invention can be realized also as a method, a program, a storage means that stores a program substantially corresponding thereto, and these can be included in the scope of the present invention.

For example, a communication control method according to a fourteenth aspect that realizes the present invention as a method is a communication control method of a communication system including a communication apparatus configured to employ an adaptive modulation system and a corresponding communication apparatus configured to communicate wirelessly with the communication apparatus, the method includes the steps of:

causing the corresponding communication apparatus to receive a wireless signal from the communication apparatus;

causing the corresponding communication apparatus to calculate a reception quality value and a bit error rate of the wireless signal;

causing the corresponding communication apparatus to transmit the reception quality value and the bit error rate to the communication apparatus;

causing the communication apparatus to specify a modulation class to be chosen corresponding to the reception quality value; and causing the communication apparatus to change the modulation class specified based on the bit error rate.

In addition, according to a fifteenth aspect of the invention, in the communication control method according to the fourteenth aspect, the modulation class is determined from a combination of a modulation system and a coding rate;

the step of changing includes performing, if the bit error rate is equal to or greater than a first threshold, at least either a decrease in the modulation system of the modulation class to be chosen to a lower modulation system or a decrease in the coding rate of the modulation class to be chosen.

Furthermore, according to a sixteenth aspect of the invention, in the communication control method according to the fifteenth aspect, the step of changing further includes performing, if the bit error rate is less than a second threshold that is smaller than the first threshold, at least either an increase in the modulation system of the modulation class to be chosen to a higher modulation system or an increase in the coding rate of the modulation class to be chosen.

Moreover, according to a seventeenth aspect of the invention, in the communication control method according to the fourteenth aspect, the step of transmitting includes transmitting a bit error rate more than once, and the step of changing includes changing the modulation class based on a plurality of bit error rates.

In addition, according to an eighteenth aspect of the invention, in the communication control method according to the fourteenth aspect, the table varies according to time.

Furthermore, according to a nineteenth aspect of the invention, in the communication control method according to the fourteenth aspect, if a plurality of corresponding communication apparatuses exist, the table varies according to the plurality of corresponding communication apparatuses.

Moreover, according to a twentieth aspect of the invention, in the communication control method according to the fourteenth aspect, the communication apparatus communicates with the corresponding communication apparatus via MIMO system.

According to the communication system, the communication apparatus and the communication control method of the present invention configured in the above-mentioned manner, decrease in the throughput can be minimized efficiently.

DESCRIPTION OF EMBODIMENTS

An embodiment in which a communication apparatus according to the present invention is applied to a base station is described below with reference to the drawings. Note that the communication apparatus according to the present invention may be applied to a communication terminal, a relay (repeater) and the like, other than a base station.

Figure 1:
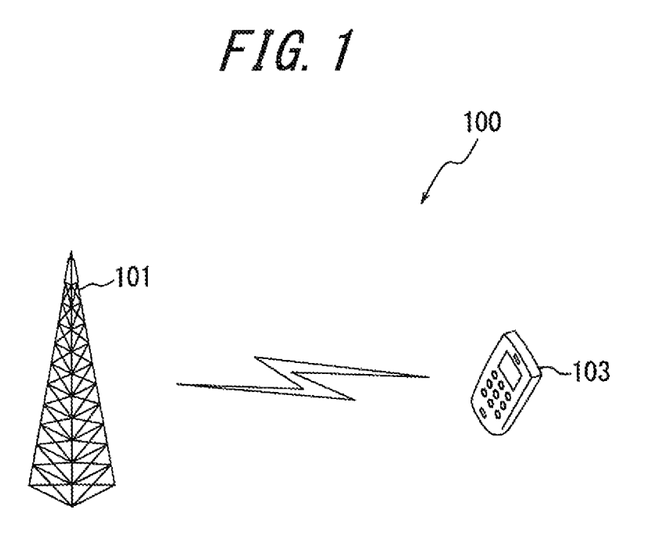
FIG. 1 is a schematic diagram of a communication system according to a first embodiment of the present invention.

FIG. 1 is a schematic diagram of the communication system according to one embodiment of the present invention. The communication system 100 includes a base station 101 and a communication terminal 103. The communication system 100 is, for example, an LTE system, an MC-CDMA system, a WiMAX system and the like. The communication system 100 may employ MIMO system. Note that, although the present embodiment is described below assuming that the base station 101 communicates with the communication terminal 103 via MIMO system, the present invention may be applied to the communication system 100 that does not employ MIMO system.

The base station 101 employs an adaptive modulation system. Thus, the base station 101 chooses a modulation class to be used for communication with the communication terminal 103 according to the communication environment between the base station 101 and the communication terminal 103. The communication terminal 103 is a corresponding communication apparatus that communicates wirelessly with the base station 101, and is, for example, a mobile phone terminal, personal computer, and the like.

The modulation class is determined from the combination of, for example, a modulation system and a coding rate. The modulation system determines the number of bits transmitted per symbol, and is, for example, BPSK (Binary Phase Shift Keying), QPSK (Quadrature Phase Shift Keying), 8PSK (8 Phase Shift Keying), 16QAM (16 Quadrature Amplitude Modulation) and 64QAM (64 Quadrature Amplitude Modulation). BPSK is a modulation system that can transmit 1 bit per symbol. QPSK is a modulation system that can transmit 2 bits per symbol. 8PSK is a modulation system that can transmit 3 bits per symbol. 16QAM is a modulation system that can transmit 4 bits per symbol. 64QAM is a modulation system that can transmit 6 bits per symbol. Hereinafter the modulation system by which a larger number of bits are transmitted per symbol is referred to as a higher modulation system, and the modulation system by which a smaller number of bits are transmitted per symbol is referred to as a lower modulation system. The higher the modulation system, the more likely the data will be destroyed (the more likely the data will be affected by noise), however, the larger the data amount to be transmitted at a time. On the other hand, the lower the modulation system, the smaller the data amount to be transmitted at a time, however, the less likely the data will be destroyed.

The coding rate indicates the error correction strength, that is, data bit allocation ratio. The larger the coding rate, the larger the ratio of the data bit to the number of bits transmitted per transmission and the smaller the ratio of the coding bit for error correction. That is, while the amount of data transmitted at a time is increased, it is less likely that the destroyed data will be recovered. In addition, the smaller the coding rate, the smaller the amount of data that can be transmitted. However, it is more likely that the destroyed data will be recovered.

For example, in the modulation class where the modulation system is QPSK and the coding rate is 1/2, 1 bit can be transmitted per symbol (2 [bit/symbol]×1/2=1[bit/symbol]). Hereinafter the modulation class by which a larger number of bits are transmitted per symbol is referred to as a higher modulation class, and the modulation class by which a smaller number of bits are transmitted per symbol is referred to as a lower modulation class.

Figure 2:
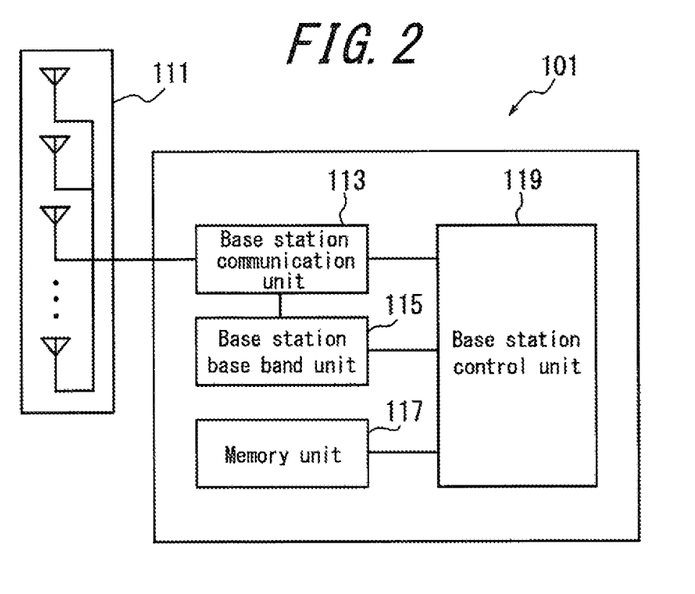
FIG. 2 is a function block diagram illustrating a schematic configuration of a base station according to the first embodiment of the present invention.

FIG. 2 is a function block diagram illustrating a schematic configuration of the base station according to one embodiment of the present invention. The base station 101 according to the present invention includes a base station communication unit (communication unit) 113 having a base station array antenna 111, a base station base band unit 115, a memory unit 117 and a base station control unit (control unit) 119. The base station communication unit 113, the base station base band unit 115 and the memory unit 117 are connected to the base station control unit 119.

The base station array antenna 111 is configured by using a plurality of antennas, and, for example, is an adaptive array antenna.

The base station communication unit 113 communicates wirelessly with the communication terminal 103 via the base station array antenna 111, and transmits/receives wireless signal (data). The base station communication unit 113 performs amplification, down conversion and the like to the received wireless signal (received signal) with a low noise, and transmits the signal to the base station base band unit 115. In addition, the base station communication unit 113 performs up conversion, amplification and the like to the signal from the base station base band unit 115 to generate a wireless signal. Then, the base station communication unit 113 transmits the wireless signal to the communication terminal 103 via the base station array antenna 111.

The base station base band unit 115 performs AD conversion and fast Fourier transform and the like to the signal received from the base station communication unit 113, thereby demodulating the received signal to extract the base band signal. Then, the base station base band unit 115 sends a base band signal to the base station control unit 119. Furthermore, the base station base band unit 115 performs inverse fast Fourier transform and DA conversion to the base band signal generated by the base station control unit 119 based on the modulation class chosen by the base station control unit 119 to modulate the base band signal, and sends the modulated base band signal to the base station communication unit 113.

The memory unit 117 stores various information such as a table for adaptive modulation, threshold relating to the bit error rate and the like, and serves also as a work memory and the like.

The table for adaptive modulation is a table indicating a modulation class to be chosen corresponding to the reception quality value of the communication terminal 103. The reception quality value of the communication terminal 103 is a value indicating quality of the signal of the base station 101 received by the communication terminal 103, and is, for example, CINR, SINR (Signal to Interference and Noise Ratio), SNR (Signal to Noise Ratio), CNR (Carrier to Noise Ratio) and the like. Hereinafter, in the present embodiment, the reception quality value is CINR value.

The table for adaptive modulation is, for example, a lookup table as shown in Table 1 below, and illustrates a correspondence between the CINR value, which is a reception quality value, and the modulation class. Note that, for convenience sake, in Table 1, modulation class is determined for CINR that is equal to or greater than 24. However, in the present invention, the lower modulation class may be allocated to the CINR less than 24.

TABLE 1

| CINR | modulation class | modulation system | coding rate | Bits/symbol |
|---|---|---|---|---|
| 24 or more and less than 26 | 1 | 16QAM | 3/4 | 3 |
| 26 or more and less than 28 | 2 | 16QAM | 7/8 | 3.5 |
| 28 or more and less than 30 | 3 | 64QAM | 2/3 | 4 |
| 30 or more | 4 | 64QAM | 3/4 | 4.5 |

The threshold relating to the bit error rate is an index for the base station 101 (the base station control unit 119 described later) to determine whether to change the modulation class to be chosen corresponding to the CINR or not (whether to change the correspondence relation between the CINR and the modulation class or not). This threshold is the value relating to the bit error rate of the signal of the base station 101 received by the communication terminal 103. Change of the modulation class includes not only change from the modulation class in use to the other modulation class prescribed previously in the table, but also any change of at least either the modulation system or the coding rate of the modulation class in use.

The threshold relating to the bit error rate is a matter arbitrary set depending on the error correction strength and the like, and hereinafter, in the present embodiment, it is assumed that, as a threshold relating to the bit error rate, two thresholds such as a first threshold and a second threshold smaller than the first threshold are set.

The base station 101 (base station control unit 119) adjusts, if the bit error rate received from the communication terminal 103 is equal to or greater than the first threshold, at least either the modulation system or the coding rate so that the bits/symbol (the number of transmission bits per symbol) will be small. That is, the base station 101 performs at least either a decrease in the modulation system of the modulation class corresponding to the received CINR to a lower modulation system or a decrease in the coding rate of the modulation class. In addition, if the bit error rate is less than the second threshold, the base station 101 (base station control unit 119) adjusts at least either the modulation system or the coding rate so that the bits/symbol will be large. That is, the base station 101 can perform at least either an increase in the modulation system of the modulation class corresponding to the received CINR to a higher modulation system or an increase in the coding rate of the modulation class. Then, the base station 101 (base station control unit 119) uses, if the bit error rate is equal to or greater than the second threshold and less than the first threshold, the modulation class corresponding to the received CINR without changing it.

Note that, in the present invention, the number of thresholds is not limited to two, and for example, one threshold may be set. The base station 101 may change, if the bit error rate is equal to or greater than the threshold (and less than the threshold), the combination of the modulation system and the coding rate so that the bits/symbol will be small (large). Furthermore, only if the bit error rate is equal to or greater than the threshold, or only if the bit error rate is less than the threshold, the base station 101 may change the combination of the modulation system and the coding rate.

In addition, if the communication system 100 employs MIMO system, the base station 101 (base station control unit 119) may set a modulation class each for a plurality of antennas of the base station array antenna 111. In this case, the base station 101 receives a CINR and a bit error rate with respect to each signal from the plurality of antennas from the communication terminal 103. Then, the base station 101 may change the combination of the modulation system and the coding rate with respect to each of the plurality of antennas of its own station.

Furthermore, if the communication system 100 employs MIMO system, the base station 101 (base station control unit 119) may set the modulation class common to the plurality of antennas of the base station array antenna 111. In this case, the base station 101 may receive, from among the CINR and the bit error rate relating to each signal from the plurality of antennas, for example, the information indicating the worst reception or the information of the average value of each of the CINR and the bit error rate, from the communication terminal 103. Then, the base station 101 may change the combination of the modulation system and the coding rate common to the plurality of antennas of its own station.

The base station control unit 119 controls and manages each function block of the base station 101 and the whole base station 101 as well. The base station control unit 119 may be configured as software executed on any preferable processor such as CPU (Central Processing Unit) and the like, or configured by using a dedicated processor specialized for each processing (e.g. DSP (Digital Signal Processor)). The processing executed by the base station control unit 119 will be described in detail below with reference to FIG. 4.

Figure 3:
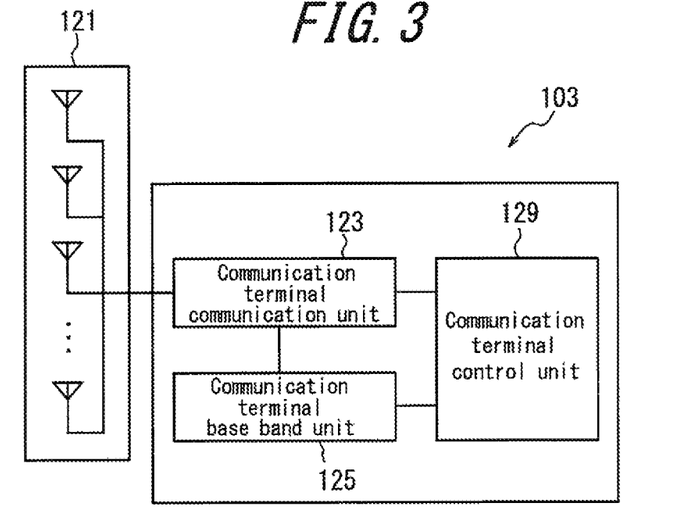
FIG. 3 is a function block diagram illustrating a schematic configuration of a communication terminal according to the first embodiment of the present invention.

FIG. 3 is a function block diagram illustrating a schematic configuration of the communication terminal according to one embodiment of the present invention. The communication terminal 103 according to the present embodiment includes a communication terminal communication unit 123 having a communication terminal array antenna 121, a communication terminal base band unit 125 and a communication terminal control unit 129. The communication terminal communication unit 123 and the communication terminal base band unit 125 are connected to the communication terminal control unit 129.

The communication terminal array antenna 121 is configured by using a plurality of antennas to realize MIMO system, and is, for example, an adaptive array antenna.

The communication terminal communication unit 123 communicates wirelessly with the base station 101 via the communication terminal array antenna 121, and transmits/receives a wireless signal. The communication terminal communication unit 123 performs amplification, down conversion and the like to the received wireless signal (received signal) with a low noise, and sends the signal to the communication terminal base band unit 125. In addition, the communication terminal communication unit 123 performs up conversion, amplification and the like to the signal from the communication terminal base band unit 125 to generate a wireless signal. Then, the communication terminal communication unit 123 transmits the wireless signal to the base station 101 via the communication terminal array antenna 121.

The communication terminal base band unit 125 performs AD conversion and fast Fourier transform and the like to the signal received from the communication terminal communication unit 123, thereby demodulating the received signal to extract a base band signal. In addition, if the communication terminal communication unit 123 receives a signal spatially multiplexed by MIMO system, the signal is demultiplexed by the communication terminal base band unit 125. Then the communication terminal base band unit 125 sends the base band signal to the communication terminal control unit 129. In addition, the communication terminal base band unit 125 performs inverse fast Fourier transform and DA conversion to the base band signal generated by the communication terminal control unit 129, thereby modulating the base band signal, and sends the modulated base band signal to the communication terminal communication unit 123.

The communication terminal control unit 129 controls and manages each function block of the communication terminal 103 and the whole communication terminal 103 as well. The communication terminal control unit 129 may be configured as software executed on any preferable processor such as CPU (Central Processing Unit) and the like, or configured by a dedicated processor specialized for each processing (e.g. DSP (Digital Signal Processor)).

The processing performed by the communication terminal control unit 129 will be described in detail below. The communication terminal control unit 129 calculates the CINR, which is the reception quality value of the signal, based on the signal received by the communication terminal communication unit 123. In addition, the communication terminal control unit 129 calculates also the bit error rate of the signal received by the communication terminal communication unit 123, and generates a signal including the information of CINR and bit error rate, controls the communication terminal base band unit 125 to modulate the signal, and causes the communication terminal communication unit 123 to transmit the signal.

If the communication system 100 employs MIMO system, the communication terminal control unit 129 may calculate the CINR and the bit error rate relating to each signal transmitted from a plurality of antennas of the base station 101. Then, the communication terminal control unit 129 may transmit the all information of the calculated plurality of CINRs and bit error rates, the information indicating the worst reception, the information of average value of each of CINRs and bit error rates and the like to the base station 101.

Figure 4:
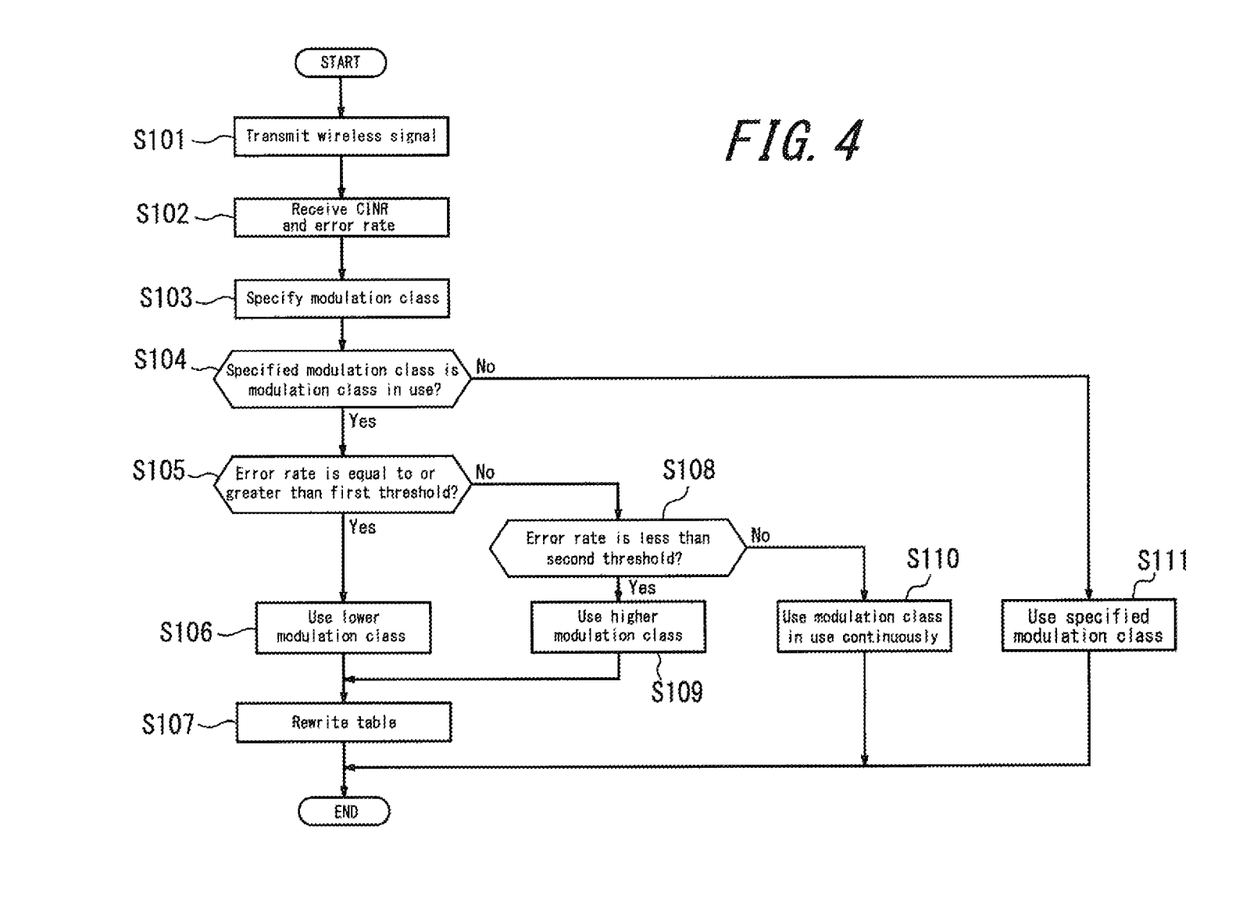
FIG. 4 is a flowchart illustrating processing of a base station according to the first embodiment of the present invention.

Next, the determination method of the modulation class in the communication system 100 is described with reference to FIG. 4. FIG. 4 is a flowchart of the base station processing according to one embodiment of the present invention. Note that the base station 101 communicates with the communication terminal 103 using the modulation class 2 in Table 1 (hereinafter referred to as the modulation class in use). In addition, note that the first threshold and the second threshold with respect to the bit error rate are respectively 10[%] and 0.1[%].

First, the base station control unit 119 of the base station 101 controls the base station base band unit 115 to modulate the signal to be transmitted to the communication terminal 103 using the modulation class 2, and controls the base station communication unit 113 to convert the modulated signal into a wireless signal and transmit it (step S101).

When the communication terminal communication unit 123 of the communication terminal 103 receives the wireless signal from the base station 101, the communication terminal control unit 129 calculates the CINR and the bit error rate of the signal periodically or non-periodically. Then, the communication terminal control unit 129 controls the communication terminal base band unit 125 and the communication terminal communication unit 123 to transmit the information of the CINR and the bit error rate.

Then, the base station communication unit 113 of the base station 101 receives the information of the CINR and the bit error rate (step S102). The base station control unit 119 specifies the modulation class corresponding to the received CINR with reference to the table for adaptive modulation stored in the memory unit 117 (step S103). Then, the base station control unit 119 determines whether or not the specified modulation class is the same as the modulation class in use (step S104).

If the specified modulation class is the same as the modulation class in use (e.g. if the received CINT is 27) (Yes in step S104), the base station control unit 119 compares the received bit error rate with the first threshold stored in the memory unit 117 (step S105).

If the bit error rate is equal to or greater than the first threshold (e.g. if the bit error rate is 15 [%]) (Yes in step S105), the base station control unit 119 may determine that the communication terminal 103 does not receive a signal from the base station 101 appropriately, despite the use of the modulation class corresponding to the CINR. That is, it means that the table stored previously in the memory unit 117 is not suitable for the current communication environment.

Thus, the base station control unit 119 changes the modulation class so that the bits/symbol will be small to prevent the data from being destroyed easily. In the present embodiment, it is assumed that the base station control unit 119 chooses the modulation system and the coding rate that corresponds to the modulation class 1, which is one class lower than class 2. Then, the base station control unit 119 uses the lower modulation class 1 and controls the base station base band unit 115 to modulate the signal to be transmitted (step S106). Note that, according to the present invention, the base station control unit 119 is not limited to the choice of the combination of the modulation system and the coding rate previously stored in the memory unit 117 to decrease bits/symbol. For example, the base station control unit 119 may decrease the coding rate from 7/8 to 5/6 without changing the modulation system of the modulation class 2 and choose a new combination of the modulation system and the coding rate (bits/symbol=4×5/6=3.3).

Then, the base station control unit 119 may rewrite the table stored in the memory unit 117 so that the correspondence relation between the received CINR and the combination of the modulation system and the coding rate chosen newly based on the bit error rate is reflected (step S107). That is, Table 1 is rewritten to Table 2 shown below. Thus, a table based on the actual communication environment between the base station 101 and the communication terminal 103 is made.

TABLE 2

| CINR | modu-lation class | modu-lation system | coding rate | Bits/symbol |
|---|---|---|---|---|
| 24 or more and less than 26 | 1 | 16QAM | 3/4 | 3 |
| 26 or more and less than 28 | 2 | 16QAM | 3/4 | 3 |
| 28or more and less than 30 | 3 | 64QAM | 2/3 | 4 |
| 30 or more | 4 | 64QAM | 3/4 | 4.5 |

In step S105, if the bit error rate is less than the first threshold (No in step S105), the base station control unit 119 compares the bit error rate with the second threshold stored in the memory unit 117 (step S108).

If the bit error rate is less than the second threshold (e.g. the bit error rate is 0[%]) (Yes in step S108), the base station control unit 119 may determine that it is highly likely that, even if the bits/symbol is increased, the communication terminal 103 can appropriately receive a signal from the base station 101.

Thus, the base station control unit 119 changes the modulation class to increase bits/symbol. In the present embodiment, it is assumed that the base station control unit 119 chooses the modulation system and the coding rate corresponding to the modulation class 3, which is one class higher than class 2. Then, the base station control unit 119 uses the higher modulation class 3 and controls the base station base band unit 115 to modulate the signal to be transmitted (step S109). Note that the present invention is not limited to the choice of the combination of the modulation system and the coding rate stored previously in the memory unit 117 to increase bits/symbol. For example, the base station control unit 119 may change the modulation system of modulation class 2 from 16QAM to the higher system of 32QAM, and change the coding rate from 7/8 to 3/4, and choose the combination of new modulation system and coding rate (bits/symbol=5×3/4=3.75).

Then, the base station control unit 119 may rewrite the table stored in the memory unit 117 so that the correspondence relation between the received CINR and the combination of the modulation system and the coding rate chosen newly based on the bit error rate will be reflected (step S107). That is, Table 1 is rewritten to Table 3 shown below. Thus, a table based on the actual communication environment between the base station 101 and the communication terminal 103 is made.

TABLE 3

| CINR | modu-lation class | modu-lation system | coding rate | Bits/symbol |
|---|---|---|---|---|
| 24 or more and less than 26 | 1 | 16QAM | 3/4 | 3 |
| 26 or more and less than 28 | 2 | 64QAM | 2/3 | 4 |
| 28or more and less than 30 | 3 | 64QAM | 2/3 | 4 |
| 30 or more | 4 | 64QAM | 3/4 | 4.5 |

In step S108, if the bit error rate is equal to or greater than the second threshold (No in step S108), the base station control unit 119 determines that the modulation class that is appropriate for the CINR of 27 is modulation class 2, and as indicated by the table stored in the memory unit 117, uses modulation class 2 continuously (step S110).

In step S102, if the received CINR is 28, the modulation class specified in step S103 will be modulation class 3. Thus, the specified modulation class and the modulation class in use are different from each other (No in step S104). In this case, the base station control unit 119 communicates with the communication terminal 103 by using the specified modulation class 3 (step S111).

In this manner, in the present embodiment, the memory unit 117 of the base station 101 stores a table indicating a modulation class to be chosen corresponding to the reception quality value transmitted by the communication terminal 103, and the base station control unit 119 changes the modulation class indicated in the table based on the bit error rate transmitted from the communication terminal 103. That is, the base station 101 receives a bit error rate indicating the actual communication environment, and the base station control unit 119 adjusts and changes the correspondence relation between the reception quality value and the modulation class based on the bit error rate. Thus, the modulation class will not continue to be chosen based on the correspondence relation between the previously determined reception quality value and the modulation class, which are initial setting values, which allows a choice of a modulation class suitable for the actual communication environment, and prevents decrease in the throughput caused by the correspondence relation of the initial setting not suitable for the actual communication environment.

Furthermore, in the present embodiment, the base station control unit 119 can perform, if the bit error rate is equal to or greater than the first threshold, at least either a decrease in the modulation system of the modulation class to be chosen corresponding to the received CINR to the lower modulation system or a decrease in the coding rate of the modulation class to be chosen. If the bit error rate is too high to allow appropriate reception of a signal by the communication terminal 103, the base station control unit 119 decreases the number of transmission bits per symbol, thereby transmitting a signal that is difficult to be destroyed to the communication terminal 103. Thus decrease in the throughput along with the reception error of the communication terminal 103 can be prevented.

Moreover, in the present embodiment, if the bit error rate is less than the second threshold that is smaller than the first threshold, the base station control unit 119 may perform at least either an increase in the modulation system of the modulation class to be chosen to a higher modulation system or an increase in the coding rate of the modulation class to be chosen. If the reception environment of the communication terminal 103 is good and it is highly likely that the communication terminal can withstand the data communication at a higher speed, the base station control unit 119 increases the number of transmission bits per symbol, thereby transmitting a signal having much data amount to the communication terminal 103. Thus the throughput can be increased.

Although the present invention has been described based on the accompanying drawings and embodiment, it should be noted that it is easy for a person skilled in the art to perform various changes and modifications based on the present disclosure. Therefore, it should be noted that these changes and modifications may be included in the scope of the present invention.

For example, the functions and the like included in each member, each unit, each step and the like may be reordered in any logically consistent way. Furthermore, units, steps and the like may be combined into one or divided.

In the description of the embodiment according to the present invention mentioned above, the base station control unit 119 changes the modulation class by comparing one value of bit error rate with the threshold relating to bit error rate. However, the present invention is not limited to this embodiment. For example, the base station control unit may change the modulation class to be used based on a plurality of bit error rates respectively relating to a plurality of signals transmitted from the base station using the same modulation class. Specifically, first, the base station communication unit receives a bit error rate more than once. Then, the base station control unit may use, if all of the bit error rates are equal to or greater than the first threshold (and less than the second threshold), a modulation class lower than the modulation class (higher than the modulation class) specified in the table. Furthermore, the base station control unit may use, if the average of the plurality of bit error rates is equal to or greater than the first threshold (less than the second threshold), a modulation class lower than the modulation class (higher than the modulation class) specified in the table. In this manner, when a plurality of bit error rates are used, the accuracy of the information of bit error rate is increased, thereby preventing the base station control unit from changing the modulation class needlessly under the influence of abrupt change in the communication environment.

In addition, in the description of the embodiment of the present invention mentioned above, the memory unit 117 stores one table for adaptive modulation. However, the present invention is not limited to this embodiment. For example, the base station control unit causes the memory unit to store tables that are different according to time (a period of time). For example, if there is a station in the communication range of the base station, the communication environment changes significantly depending on whether or not the period of time is commuting hours. Thus, if the memory unit has a table corresponding to the time, the base station control unit can easily specify an appropriate modulation class corresponding to the bit error rate without changing significantly the correspondence relation between the CINR and the modulation class indicated on the table.

Furthermore, in the description of the embodiment according to the present invention mentioned above, the number of communication terminals 103 communicated with the base station 101 is one. However, the present invention is not limited to this embodiment. For example, the base station may communicate with a plurality of communication terminals, and the base station control unit may cause the memory unit to store a plurality of tables corresponding to the plurality of communication terminals. If the memory unit has a table corresponding to a plurality of communication terminals, the base station can easily specify an appropriate modulation class corresponding to the bit error rate without changing significantly the correspondence relation between the CINR and the modulation class indicated on the table.

REFERENCE SIGNS LIST

100 Communication system
101 Base station (communication apparatus)
103 Communication terminal (corresponding communication apparatus)
111 Base station array antenna
113 Base station communication unit (communication unit)
115 Base station base band unit
117 Memory unit
119 Base station control unit (control unit)
121 Communication terminal array antenna
123 Communication terminal communication unit
125 Communication terminal base band unit
129 Communication terminal control unit

The invention claimed is:

1. A communication system comprising a communication apparatus configured to employ an adaptive modulation system and a corresponding communication apparatus configured to communicate wirelessly with the communication apparatus, wherein the corresponding communication apparatus receives a wireless signal from the communication apparatus, calculates a reception quality value and a bit error rate of the wireless signal, and transmits the reception quality value and the bit error rate to the communication apparatus; and the communication apparatus, which has a table containing a plurality of modulation classes chooses a modulation class of the plurality of modulation classes of the table corresponding to the calculated reception quality value, wherein in response to when the calculated bit error rate is equal to or greater than a first threshold, the communication apparatus updates the table so as to change at least one parameter of the chosen modulation class based on the calculated bit error rate; and in response to when the calculated bit error rate is equal to or less than a second threshold, which is smaller than the first threshold, the communication apparatus updates the table so as to change at least one parameter of the chosen modulation class based on the calculated bit error rate.

2. The communication system according to claim 1, wherein each modulation class is determined from a combination of a modulation system and a coding rate; and the communication apparatus performs, if the bit error rate is equal to or greater than a first threshold, at least either a decrease in the modulation system of the chosen modulation class to a lower modulation system or a decrease in the coding rate of the chosen modulation class.

3. The communication system according to claim 2, wherein the communication apparatus performs, if the bit error rate is less than a second threshold which is smaller than the first threshold, at least either an increase in the modulation system of the chosen modulation class to a higher modulation system or an increase in the coding rate of the chosen modulation class.

4. The communication system according to claim 1, wherein
the communication apparatus receives a bit error rate from the corresponding communication apparatus more than once, and changes the chosen modulation class based on a plurality of bit error rates.

5. The communication system according to claim 1, wherein the table varies according to time.

6. The communication system according to claim 1, wherein, if a plurality of corresponding communication apparatuses exist, the table varies according to the plurality of corresponding communication apparatuses.

7. The communication system according to claim 1, wherein the communication apparatus communicates with the corresponding communication apparatus via MIMO (Multiple Input Multiple Output) system.

8. A communication apparatus configured to employ an adaptive modulation system and to communicate wirelessly with a corresponding communication apparatus that calculates a reception quality value and a bit error rate of a wireless signal from the communication apparatus; comprising
a communication unit that receives the reception quality value and the bit error rate from the corresponding communication apparatus;
a memory unit that stores a table containing a plurality of modulation classes including a modulation class chosen corresponding to the reception quality value; and
a control unit that: (1) updates the table so as to change at least one parameter of the chosen modulation class based on the received bit error rate in response to when the received bit error rate is equal to or greater than a first threshold, and (2) updates the table so as to change at least one parameter of the chosen modulation class based on the received bit error rate in response to when the received bit error rate is equal to or less than a second threshold, which is smaller than the first threshold.

9. The communication apparatus according to claim 8, wherein
each modulation class is determined from a combination of a modulation system and a coding rate; and
the control unit performs, if the bit error rate is equal to or greater than a first threshold, at least either a decrease in the modulation system of the chosen modulation class to a lower modulation system or a decrease in the coding rate of the chosen modulation class.

10. The communication apparatus according to claim 9, wherein
the control unit performs, if the bit error rate is less than a second threshold that is smaller than the first threshold, at least either an increase in the modulation system of the chosen modulation class to a higher modulation system or an increase in the coding rate of the chosen modulation class.

11. The communication apparatus according to claim 8, wherein
the communication unit receives a bit error rate from the corresponding communication apparatus more than once, and the control unit changes the chosen modulation class based on a plurality of bit error rates.

12. The communication apparatus according to claim 8, wherein, if a plurality of the corresponding communication apparatuses exist, the table varies according to the plurality of corresponding communication apparatuses.

13. The communication apparatus according to claim 8, wherein the communication apparatus communicates with the corresponding communication apparatus via MIMO system.

14. A communication control method of a communication system comprising a communication apparatus configured to employ an adaptive modulation system and a corresponding communication apparatus configured to communicate wirelessly with the communication apparatus, including the steps of:
causing the corresponding communication apparatus to receive a wireless signal from the communication apparatus;
causing the corresponding communication apparatus to calculate a reception quality value and a bit error rate of the wireless signal;
causing the corresponding communication apparatus to transmit the reception quality value and the bit error rate to the communication apparatus;
causing the communication apparatus to specify a modulation class located in a table containing a plurality of modulation classes, which is chosen corresponding to the reception quality value;
causing the communication apparatus to update the table so as to change at least one parameter of the chosen modulation class based on the calculated bit error rate in response to when the calculated bit error rate is equal to or greater than a first threshold; and
causing the communication apparatus to update the table so as to change at least one parameter of the chosen modulation class based on the calculated bit error rate in response to when the calculated bit error rate is equal to or less than a second threshold, which is smaller than the first threshold.

15. The communication control method according to claim 14, wherein
each modulation class is determined from a combination of a modulation system and a coding rate;
the step of changing includes performing, if the bit error rate is equal to or greater than a first threshold, at least either a decrease in the modulation system of the chosen modulation class to a lower modulation system or a decrease in the coding rate of the chosen modulation class.

16. The communication control method according to claim 15, wherein
the step of changing further includes performing, if the bit error rate is less than a second threshold that is smaller than the first threshold, at least either an increase in the modulation system of the chosen modulation class to a higher modulation system or an increase in the coding rate of the chosen modulation class.

17. The communication control method according to claim 14, wherein the step of transmitting includes transmitting a bit error rates more than once, and the step of changing includes changing the chosen modulation class based on a plurality of bit error rates.

18. The communication control method according to claim 14, wherein the table varies according to time.

19. The communication control method according to claim 14, wherein, if a plurality of corresponding communication apparatuses exist, the table varies according to the plurality of corresponding communication apparatuses.

20. The communication control method according to claim 14, wherein the communication apparatus communicates with the corresponding communication apparatus via MIMO system.

* * * * *